United States Patent [19]

Kent

[11] Patent Number: 4,741,660

[45] Date of Patent: May 3, 1988

[54] APPARATUS FOR LIFTING AND TRANSPORTING POWERED WHEELCHAIRS

[76] Inventor: Jimmy J. Kent, P.O. Box 634, Denham Springs, La. 70727-0634

[21] Appl. No.: 774,020

[22] Filed: Sep. 9, 1985

[51] Int. Cl.[4] .................. B60P 03/06; B60R 09/06
[52] U.S. Cl. ............................ 414/462; 414/540; 414/622
[58] Field of Search ............. 414/462, 921, 495, 622, 414/541, 540; 224/42.03 R, 42.07, 42.08; 280/769

[56] References Cited

U.S. PATENT DOCUMENTS

| | | | |
|---|---|---|---|
| 2,531,107 | 11/1950 | Burkey | 224/42.03 R X |
| 2,661,857 | 12/1953 | McNutt | 414/622 |
| 2,768,761 | 10/1956 | Vandemark et al. | 414/622 |
| 3,090,516 | 5/1963 | Seymour et al. | 414/622 |
| 3,885,689 | 5/1975 | Grove et al. | 414/462 |
| 4,026,387 | 5/1977 | Abreu | 414/921 X |
| 4,268,209 | 5/1981 | Westerman | 414/462 |
| 4,400,129 | 8/1983 | Eisenberg et al. | 414/921 X |
| 4,456,421 | 6/1984 | Robson | 414/541 X |
| 4,479,753 | 10/1984 | Thorley | 414/541 |
| 4,493,603 | 1/1985 | Williams et al. | 414/921 X |
| 4,671,729 | 6/1987 | McFarland | 414/462 |

FOREIGN PATENT DOCUMENTS 2512756  3/1983  France ........................ 414/921

Primary Examiner—Frank E. Werner
Assistant Examiner—Janice Krizek
Attorney, Agent, or Firm—William D. Kiesel; Robert C. Tucker; Timothy J. Monahan

[57] ABSTRACT

A vehicle-mounted apparatus for lifting and transporting a wheelchair is provided comprising a base onto which the power wheelchair is driven and parked, and having a motorized lift mechanism which lifts the base and wheelchair to a height necessary for transport wherein the base is provided with a subassembly which will keep the base from yawing about the axis formed by the lifting mechanism. Additional subassemblies are provided which hold the wheelchair on the base once it is in the raised position.

1 Claim, 3 Drawing Sheets

APPARATUS FOR LIFTING AND TRANSPORTING POWERED WHEELCHAIRS

BACKGROUND OF THE INVENTION

1. Field of Invention

This invention relates in general to devices for lifting and transporting which are mounted upon vehicles and more particularly to a vehicularly mounted apparatus for lifting and transporting powered wheelchairs.

2. Description of the Prior Art

Hand-propelled wheelchairs are compact, light and easy to fold up and placed in an automobile trunk. By contrast, powered electric wheelchairs are considerably larger and heavier; for example, one popular model weighs 110 pounds. Powered chairs are a great advancement over hand-propelled, manual wheelchairs as they increase speed and mobility, indeed some invalids cannot even operate a manual wheelchair because of the nature of their condition. While there is a great need by the general public (not only the invalids but also their family and friends) for a means to move these heavy, powered wheelchairs from one location to the next by automobile, existing equipment for doing so is insufficient.

Current equipment for transporting powered wheelchairs includes a hoisting mechanism which is bolted inside the automobile's trunk for lifting the wheelchair directly into the car trunk. Firstly, the seat must be removed so that the wheelchair is of a low-profile and will allow the trunk to be closed. Secondly, the hoist and boom mechanism is rotated outside the trunk and a cable system is attached to the wheelchair. The wheelchair is then raised by winch and rotated back towards the trunk where it is lowered in place. This is a very cumbersome task for anyone, much less the physically impaired.

A second apparatus for transporting electric wheelchairs consists of a ramp at the rear of the vehicle, up which the wheelchair is moved to a platform where the wheelchair rides during transport. After loading the wheelchair, the ramp is stored under the platform during transport. The ramp must be raised at the edge, which touches the ground and then must be slid under the platform with the reverse order of steps taking place before unloading. This presents a problem for invalids using the ramp without assistance.

In a third method, a trailer is used to transport the wheelchair. Unfortunately, this also adds to the effective length of the vehicle, making it an impossibility to park in a standard, single-car parking space. Pulling a trailer is often no problem for a person who is not physically impaired as he/she can merely drive to a location in the parking lot at a distance from heavy traffic where two spaces may be occupied. By comparison, handicapped parking zones are near the entrance of buildings and do not allow for a vehicle-trailer combination. An invalid would also have difficulty hooking up and removing a trailer; this problem is similar to the limiting features of ramps and hoist mechanisms in the prior art.

This invention fills a void left by the prior art which allows a physically impaired person to transport their powered wheelchair simply by driving the chair onto a flat surface and pushing a button, thereby moving the chiar to a raised, transport-ready position without the need for winch-booms, ramps, or trailers.

While the aforedescribed problem has existed for years, no relevant disclosures were discovered in the prior art which offered a viable solution. The following patents are illustrative of the relevant prior art:

| U.S. Pat. No. | INVENTOR | ISSUED | TITLE |
| --- | --- | --- | --- |
| 4,127,200 | Elbert T. Mann | 11/28/78 | WHEELCHAIR LIFT DEVICE |
| 3,675,833 | Robert D. Barr | 7/11/72 | CARRYING RACK FOR MOTORCYCLE OR SIMILAR DEVICE |
| 3,994,425 | Joseph V. Graber | 11/30/76 | AUTOMOBILE BICYCLE CARRIER |
| 4,019,752 | Denny Leon, and Fredrick M. Stewart | 4/26/77 | WHEELCHAIR RESTRAINT DEVICE |
| 4,113,270 | Chester J. Barecki | 9/12/78 | WHEELCHAIR RETAINER MECHANISM |
| 4,193,526 | Donald Rosmarinofski | 3/18/80 | TWO-WHEELED VEHICLE CARRIER |
| 3,927,810 | Michael Danon | 12/23/75 | BICYCLE SUPPORT RACK |
| 4,461,413 | Griffith L. Hoerner | 7/24/84 | RETRACTABLE, ARTICULATED CARRIER FOR VEHICLES |
| 4,437,599 | Harold G. Jordening | 3/20/84 | BICYCLE/ WHEELCHAIR CARRIER |

SUMMARY OF THE INVENTION

It is therefore an object of this invention to provide a mechanically simple, easy to use, apparatus for transporting a powered wheelchair with an automobile or similar vehicle.

Another object of this invention is to provide an apparatus which will lift the wheelchair from ground level to a height necessary for transport.

It is further an object of this invention to provide braces which will hold the powered wheelchair in place while in transport.

Still another object of this invention is to provide an apparatus with guides so that the powered wheelchair may be easily and correctly positioned on the apparatus.

It is also an object of this invention to provide an apparatus for transporting a powdered wheelchair which may be folded up against its carrier vehicle is an out-of-the-way position when not in use.

It is further an object of this invention to provide an apparatus which may be adjusted to differing heights and pitches to properly fit various models and types of vehicles.

Other objects, advantages, and novel features of the present invention will become apparent from the following detailed description of the invention when considered in conjunction with the acompanying drawings.

Accordingly, a vehicle-mounted apparatus for lifting and transporting a wheelchair is provided comprising a base onto which the power wheelchair is driven and parked, a motorized lift mechanism which lifts the base and wheelchair to a height necessary for transport whereby the base is provided with a subassembly which will keep the base from yawing about the axis formed by the lifting mechanism. Additional subassemblies are provided which hold the wheelchair on the base once it is in the raised position.

DETAILED DESCRIPTION OF THE INVENTION

Figure 1:
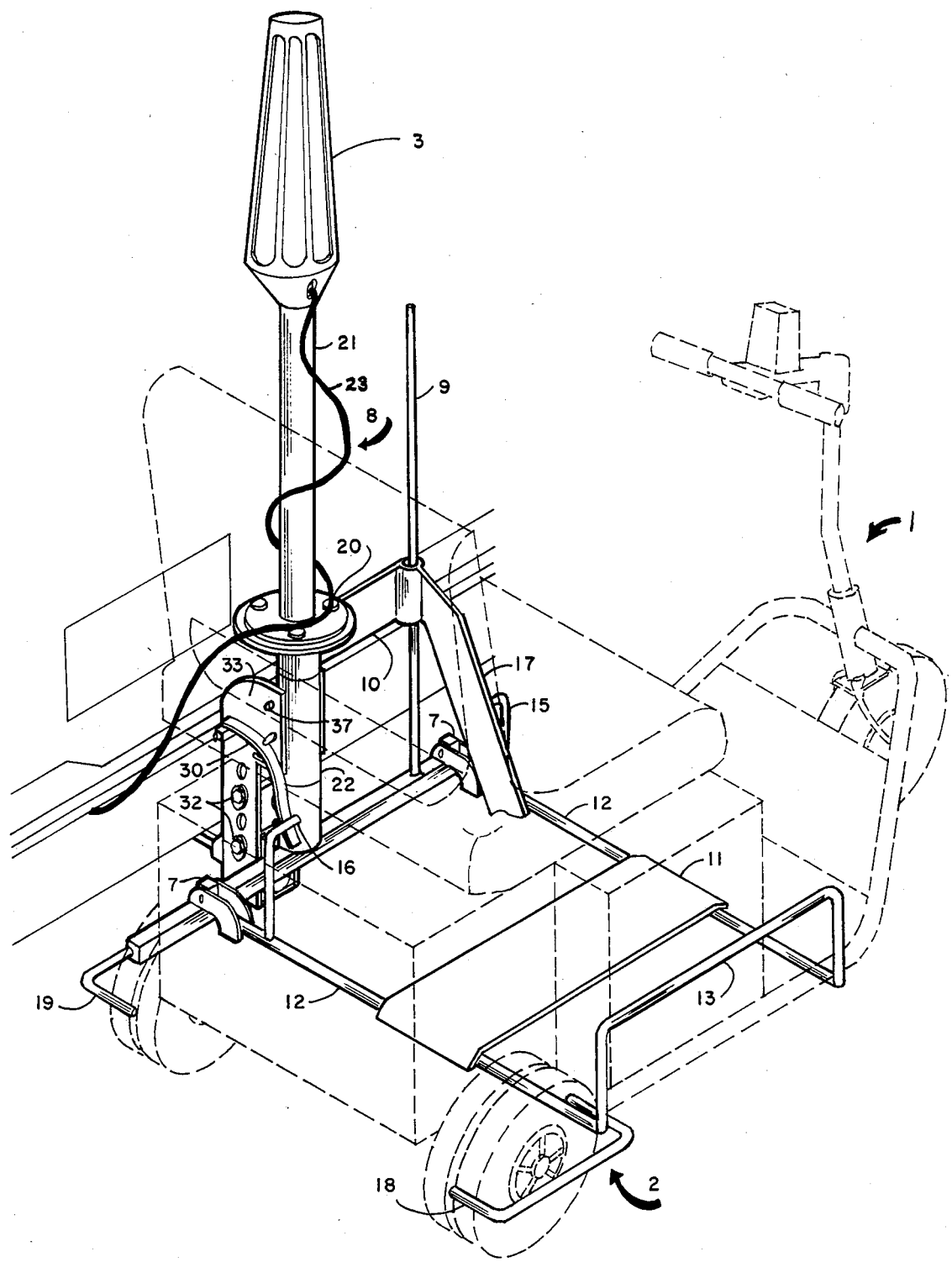
FIG. 1 is a three-dimensional view showing a powered wheelchair loaded on the apparatus for lifting and carrying with the base in the up position.

Referring now to FIG. 1, an outline of a powered wheelchair 1 is shown resting upon a base denoted generally as 2 in the raised position. This base has several features which serve to align and hold the powered wheelchair 1 on the apparatus. The base is raised and lowered by means of an electric motor 3.

Figure 2:
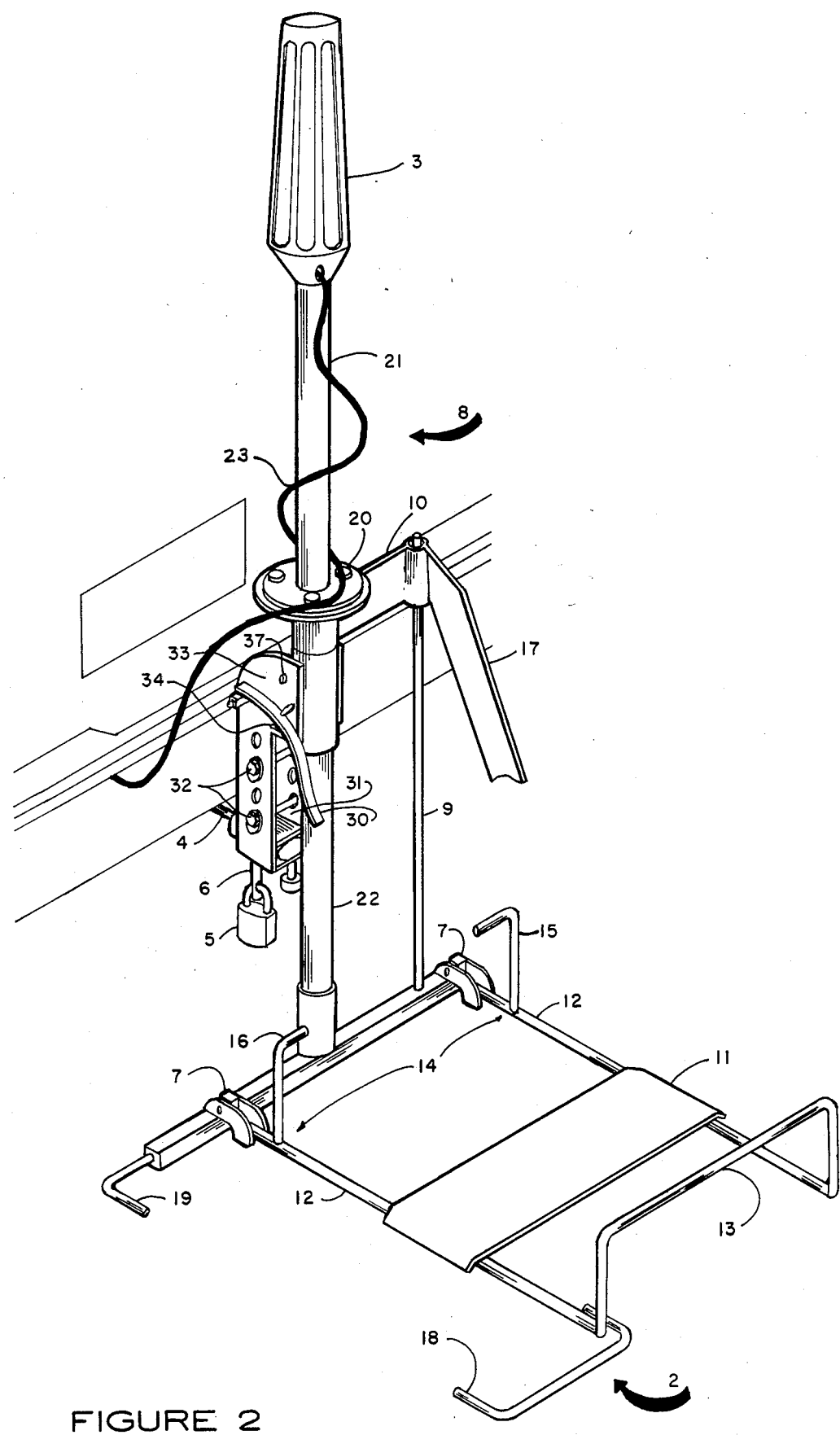
FIG. 2 is a three-dimensional view from the same angle as FIG. 1 with the base in the down position without a powered wheelchair being shown.

The apparatus for lifting and carrying a wheelchair is shown without the powered wheelchair 1 in a down position in FIG. 2. This figure shows in detail how the apparatus mounts to an automobile on a standard trailer hitch 4. The apparatus is secured to the trailer hitch 4 with a mounting and support bracket 31 which is further secured to trailer hitch 4 with a mounting bolt 6. A padlock 5 further secures the apparatus through a hole in the mounting bolt 6. This serves two purposes, first to make the apparatus very difficult to steal, and secondly to make a very secure mount to keep from losing the powered wheelchair in transit.

FIG. 2 also details when base 2 is lowered, its design contours with rises in the ground with the use of hinges 7. These hinges 7 also allow for the base 2 to be folded up against the electric motor 3 and electric motor shaft tube 8 at times when the powered wheelchair 1 is not being carried by the apparatus. This fold-up of the base may be performed automatically by positioning the curved lift guide 30 in an upward position which allows the rear inner alignment guide 16 to engage the underside of the curved lift guide 30 as base 2 is lifted by electric motor 3 thereby, gradually lifting and turning base 2. When the base is to be left in the down position for carrying a wheelchair the curved lift guide 30 should be located in a down position where it will not make contact with the rear inner alignment guide 16.

An alignment shaft 9 is perpendicularly attached to the base 2. This alignment shaft 9 rides within an alignment shaft guide 10 which is affixed at one end to the electric motor shaft tube 8. The purpose of this alignment shaft 9 is to keep the powered wheelchair 1 while resting on the base 2 from yawing from side to side as it is being transported. The alignment shaft 9 will also be of assistance in keeping the electric motor shaft tube 8 aligned with the base 2 while the powered wheelchair 1 is being lifted by the electric motor 3.

Figure 3:
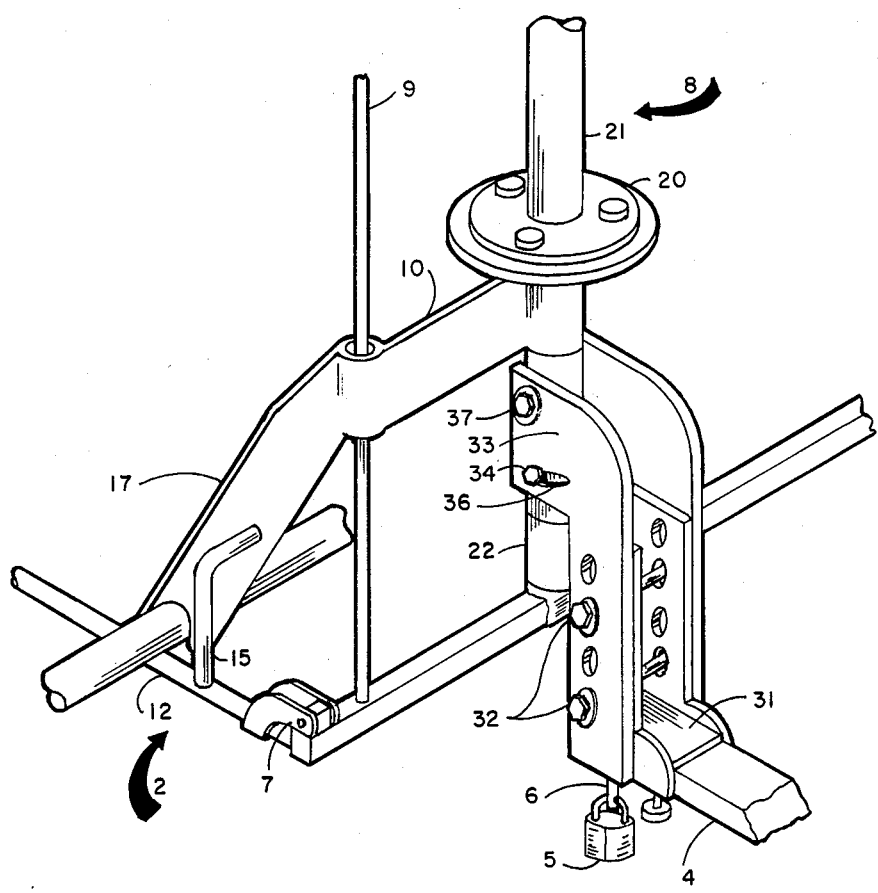
FIG. 3 shows a detail of the brace/clamp which holds the wheelchair upon the base.

The base 2 is also equipped with four different alignment guides. The first of which consists of flat wheel plate 11 upon which the front wheel of the powered wheelchair 1 may be driven up and upon the base 2. This flat wheel plate 11 serves a dual purpose. First of all, it is a guide which directs the wheelchair operator in guiding the powered wheelchair 1 onto the base 2, and secondly, it provides a means to smoothly drive the powered wheelchair 1 over the tubular base components 12 of the base 2. A second alignment guide, the outer alignment guide 13, assures that the powered wheelchair 1 will not be driven so as to allow the powered wheelchair 1 to rest too far out on the base 2. When the base is raised, the operator will immediately know if the wheelchair is improperly positioned because the wheelchair will sit at an awkward angle. The base 2 is also made up of a third alignment guide, an inner alignment guide denoted generally as 14. The inner alignment guide 14 is composed of two parts: the forward inner alignment guide 15 and the rear inner alignment guide 16. The inner alignment guide 14 has two parts thereby creating a gap to allow the brace 17 to make contact with the powered wheelchair 1 when the base 2 is in its raised position. This feature may readily be seen on FIG. 3. The inner alignment guide 14 serves the same function as the outer alignment guide 13 in that it properly positions the powered wheelchair 1 onto the base 2 and will immediately tell the operator if the powered wheelchair 1 is not in proper position.

The base 2 consists of a fourth alignment guide or more correctly stated a set of alignment guides. These are for the rear wheels of the powered wheelchair 1. The outer wheel guide 18 and the inner wheel guide 19 not only serve as an individual index for the operator to align the wheelchair up on the base, but also in the raised position, these two wheel guides surround and further secure the rear wheels of the powered wheelchair 1 as may be seen in FIG. 1.

The electric motor shaft tube 8 is further comprised of a upper electric motor tube unit 21 and a lower electric motor tube unit 22 which are joined by a coupling plate 20. This allows access for maintenance to the electric motor shaft itself (not shown). The electric motor switch line 23 runs from the electric motor 3 to the key switch (not shown). The key switch is then connected to the power supply by means of a power line (not shown). This will prohibit unauthorized use of the lift.

The apparatus may also be adjusted to fit different types and models of equipment. The height of the apparatus may be adjusted by bolts 32 aligned through apertures in the electric motor shaft tube bracket 33 and the mounting and support bracket 31 whereby differing apertures are used for differing heights. The pitch of the apparatus may be changed by loosening nut 34 on a pitch bolt (not shown) and rotating the electric motor shaft tube 8 about pivot bolt 37 to a new pitch and tightening the same nut 34 on the pitch bolt at a new position within alignment channel 36.

Many other variations, modifications, and alternate embodiments may be made in the apparatus and techniques hereinbefore described, by those having experience in this technology, without departing from the concept of the present invention. Accordingly, it should be clearly understood that the apparatus and methods depicted in the accompanying drawings and referred to in the foregoing description are illustrative only and are not intended as limitations on the scope of this invention, as defined in the following claims.

I claim:

1. An apparatus for lifting and transporting a powered wheelchair, mountable on the rear of a vehicle, comprising:
   (a) a lifting means having a stationary section and a vertically adjustable travelling section;
   (b) a hitching means for connecting said lifting means to the rear of a vehicle;
   (c) a substantially rectangular base for carrying said wheelchair in an upright position, said base having a hinged edge connected to said travelling section of said lifting means whereby said base may be folded up close to the rear of a vehicle when not carrying a wheelchair;
(d) a vertical alignment shaft having a lower end rigidly connected to said base;
(e) an alignment shaft guide having a first end rigidly connected to said stationary section of said lifting means and a second end through which said alignment shaft is matingly slidable when said base is raised and lowered; and
(f) a brace, rigidly connected at one end to said alignment shaft guide, having an opposite end extending over said base to pin the powered wheelchair between said brace and said base when said base is raised.

* * * * *